April 3, 1956  S. S. SHAMIS ET AL  2,740,205
RADAR SIMULATOR CIRCUIT
Filed Aug. 27, 1952
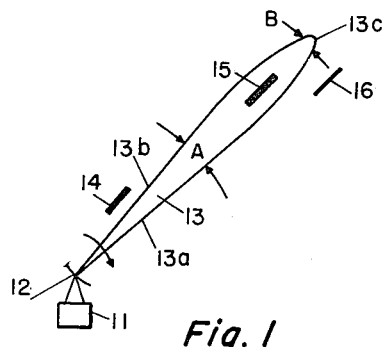
Fig. 1
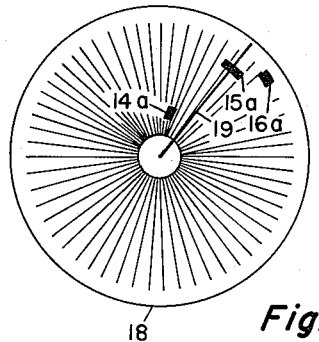
Fig. 2
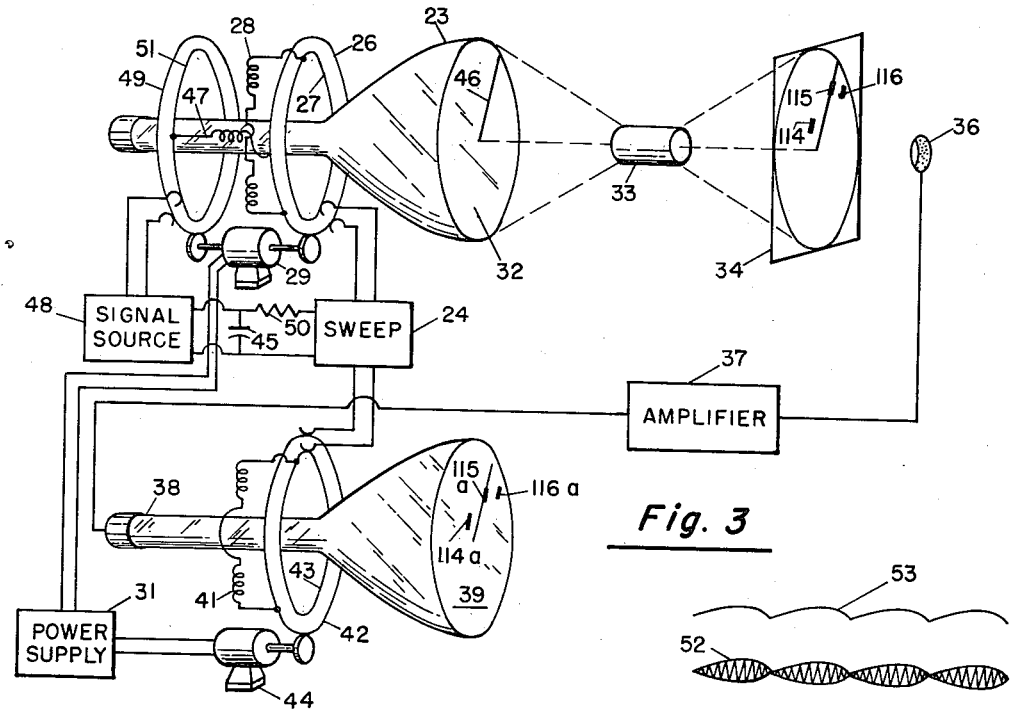
Fig. 3
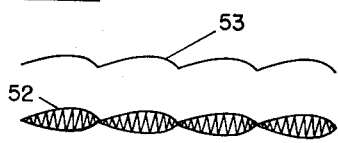
Fig. 5
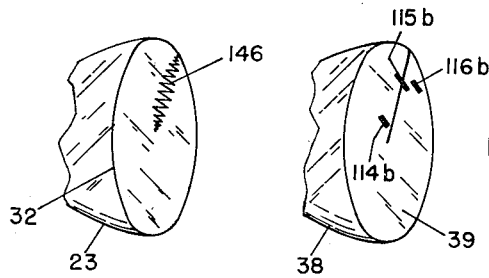
Fig. 4  Fig. 4a  Fig. 6
INVENTORS
SIDNEY S. SHAMIS
ARTHUR J. TALAMINI, JR.
BY
Darby + Darby
ATTORNEYS United States Patent Office 2,740,205
Patented Apr. 3, 1956

2,740,205

RADAR SIMULATOR CIRCUIT

Sidney S. Shamis, West Orange, and Arthur J. Talamini, Jr., Little Falls, N. J., assignors to Allen B. Du Mont Laboratories, Inc., Clifton, N. J., a corporation of Delaware Application August 27, 1952, Serial No. 306,672

1 Claim. (Cl. 35—10.4)

This invention relates to radar simulators for use in training radar operators.

In training operators to interpret the patterns produced on radar indicators such as plan position indicators (P. P. I.) an attempt is customarily made to reproduce, on a suitable radar-type indicator, indications resembling those encountered in actual practice. An important problem is to create a realistic impression of a true radar presentation.

A radar P. P. I. presentation usually includes a cathode ray screen in which a radial line rotates about the screen in the manner of a spoke of a rotating wheel. When a target is present, a spot on the "spoke" brightens greatly in intensity, the distance outward from the screen center being indicative of the range or distance to the target, and the direction of the spot relative to the screen center being indicative of the direction to the target.

Due to an effect produced by the finite dimensions of the radar antenna radiation pattern, discussed hereinbelow, the nature of the spots differs at different areas of the radar screen, even for identical targets. For example, close targets produce small indications or spots, the spot indications increasing in size to a maximum for some predetermined range, and then diminishing for larger ranges. This effect, when properly interpreted, is useful in giving the observer an indication of the size or nature of the target. However, in radar simulators, this effect is generally absent.

A principal object of this invention is to provide means for adding this effect to the simulated indication. This is done by modifying the signals impressed upon a cathode ray tube indicator in accordance with principles described below, to produce the above mentioned desired effect. Other objects leading toward an improved scanning arrangement will be apparent from the following specification and drawings in which:

Figure 1 is a diagrammatic representation of an actual radar set, showing the relationship of its antenna beam to targets being indicated.

Figure 2 shows the corresponding picture displayed on a plan position indicator, under the conditions shown in Figure 1.

Figure 3 is a diagrammatic representation of a radar simulator.

Figure 4 is a fragmentary perspective view of the tube 23 of Figure 3, showing an improved pattern thereon.

Figure 4A is a fragmentary perspective view of the tube 38 of Figure 3, showing the improved indications thereon.

Figure 5 shows time graphs of wave forms useful in explaining the invention.

Figure 6 shows a modified image mask useful in attaining the advantages of the invention.

In Figure 1 there is shown a radar apparatus 11 having a directive antenna 12. The radar apparatus 11 generates pulses of radiant energy which are supplied to and radiated by antenna 12. Most of the radiated energy is restricted by the antenna 12 into a pencil-like lobe or beam 13, and the antenna is rotated according to a known plan to cause the lobe to be directed systematically and cyclically toward all points of a given target area. For illustrative purposes, the target area is assumed to include three identical targets 14, 15 and 16. These targets are illustrated as of short length pointing directly toward the antenna 12. Target 15 is assumed to lie within the lobe 13 while target 14 is closer to the antenna 12 and to the left of the lobe, and target 16 is farther from the antenna 12 and to the right of the lobe 13.

In accordance with well known radar principles, each target reflects part of the radiant energy impinging on it, and the reflected energy is picked up by antenna 12 and used within the apparatus 11 to produce an indication of the targets.

This indication is illustrated in Figure 2, which shows a plan position indicator (P. P. I.) screen 18 such as is commonly used in radar apparatus 11. Screen 18 is the faceplate of a cathode ray tube, the remainder of which is not shown, and a pattern of light thereon is traced out by a cathode ray beam trace moving radially from the center of the screen 18 to its periphery along a radial line 19 which is continuously rotated like a spoke of a wheel by means to be more fully described hereinafter. The line 19 is generally quite faint, and corresponds at each instant to the direction of lobe 13. The targets 14, 15 and 16 of Figure 1 appear on screen 18 as spots of light 14a, 15a and 16a, each spot having a direction relative to the center of screen 18 corresponding to the direction of its respective target, and spaced from the screen center by a distance corresponding to the range of the target.

It will be noticed that the slender rod-like targets 14, 15 and 16 of Figure 1 are represented in Figure 2 by light spots 14a, 15a and 16a which differ more or less in shape. This is caused by the finite width of the lobe 13 and by its shape, which is formed generally by two radial lines 13a and 13b subtending a fixed angle A, and joined by a rounded tip portion 13c. Targets 14 and 15 are thus within the lobe 13 during a time corresponding to a rotation of A radians by the antenna 12, while target 16, being at the tip of the lobe, intercepts the beam only during a time corresponding to a reduced angle of B radians. Therefore, indicated spots 14a and 15a of Figure 2 cover A radians on screen 18 while spot 16a covers B radians. Since target 14 is relatively close to the antenna 12 in Figure 1, the actual width of spot 14a is less than that of spot 15a, as is spot 16a.

It is essential that the radar operator be able to interpret properly the targets represented by the patterns on the P. P. I. screen which include such inherent distortions. Accordingly, for proper training, a radar simulator should produce corresponding indications. To this end the apparatus of Figure 3 is provided.

In Figure 3 a flying-spot scanner tube 23 is provided, whose electron beam is subjected to the same type of deflection as the beam of the tube in Figure 2. As illustrative of but one way in which this deflection may be obtained, electrical signals are generated in a sweep circuit 24 and supplied through a pair of slip rings 26 and 27 to a deflection coil 28. Coil 28 is arranged to deflect the electron beam in a radial direction which is continually changed by a motor 29 energized by a power source 31 to rotate the coil 28. By causing the circuit 24 to generate a sawtooth current wave, such as illustrated at 51 in Figure 5, at a frequency high compared to the rotation of the coil 28, the trace 46 appears as a radial spoke rotating about the center of screen 32 of tube 23.

Light from the screen 32 of tube 23 is focussed by a lens system 33 onto an image area 34 which may be a transparency of an aerial photograph or a drawing or the like containing simulated radar targets 114—116. These simulated targets are identical in configuration with targets 14, 15 and 16 in Figure 1. For example, the targets 114, 115 and 116 may be properly shaped miniature markers maneuverable across the image area 34 in accordance with actual or practise tactical defense problems.

After passing through and/or being affected by the image 34, the light is collected by a photocell 36 in which it is transformed to an electrical signal. If image 34 is a transparency with relatively opaque target representations 114, 115 and 116, the signal thus derived will be uniform except for diminished intensity for those instants when the flying spot of screen 32 is masked by target representations 114, 115 or 116. Conversely, if image 34 is formed as an opaque mask with apertures forming the target representations, the signal will be uniform except for increased intensity at instants corresponding to passage of light from the flying spot through the target representation apertures. This signal is then passed to an amplifier 37, where it is raised to an amplitude sufficient to modulate the beam of a farther cathode ray tube 38. Deflection of the cathode ray beam in tube 38 is by means of a deflection coil 41 connected through slip rings 42 and 43 to the same (or a like) sweep signal source 24. Coil 41 is rotated by a motor 44 connected to the same power supply 31 as motor 29 and operated in synchronism therewith. In this manner, the pattern swept out by the beam of tube 38 is identical with that of tube 23. In addition, the intensity of the beam of tube 38, and hence the intensity of its spot image, is controlled by the output of amplifier 37 so that, at the instants corresponding to impingement of the flying spot image of tube 23 on the target representative areas of image 34, the spot appearing on screen 39 of tube 38 is intensified to reproduce target simulating indications 114a, 115a and 116a.

The pattern traced out on the screen 39 is a substantially exact duplicate of the simulated targets 114, 115 and 116 on the image area 34. By this means the electrically reproduced images 114a, 115a and 116a on screen 39 would be short, radial lines such as 14, 15 or 16 of Figure 1, instead of the properly distorted desired spots 14a, 15a and 16a produced on the screen 13 of an actual radar indicator.

In order to produce properly formed spots, means are provided to increase the area covered by the scanning line 46 of tube 23 to match the shape of the lobe 13 in Figure 1. As will be readily seen, the width of the line 46 should be increased at each of the indication spots, without simultaneously increasing the length as would be the case if the spot were merely defocussed to a diameter corresponding to the width of the lobe 13 in Figure 1 at any (proportional) distance from the center.

In order to provide the necessary width increase, another deflection coil 47 is mounted on the neck of tube 23 at substantially a right angle to coil 28. Coil 47 is excited by a high frequency signal generated by a source 48 and supplied to coil 47 by a slip rings 49 and 51. By making the frequency supplied from source 48 high relative to that of source 24, and because of the 90° relationship between coils 28 and 47, the cathode ray spot will be moved rapidly back and forth perpendicular to line 46 about its center location on line 46. If the output from source 48 were of uniform amplitude, the line 46 would widen uniformly to a stripe of width corresponding to the amplitude of the source 48 output. However, according to the invention, the width of line 46 is made variable along its length. For a simple system, yielding an approximation of the desired type of indication, the width of line 46 may be made uniformly tapered, being minimum at the center and maximum at the edge of the indicator screen. For a more complete indication, the width of line 46 is made to simulate the shape of the lobe 13 of Figure 1. This is done by proper wave forms derived from source 48.

It is customary for the scanning line 46 to be generated by applying a sawtooth-shaped current wave 51, shown in Figure 5, to coil 28, the repetition rate of the the wave being determined by the range of the radar system and by other factors known to those skilled in the art. It is essential that the frequency of oscillations 52 applied to coil 47 be high in comparison to the repetition rate of wave 51 in order to cover completely the area adjacent the scanning line 46 so as not to miss any minute simulated targets.

To provide the approximate indication referred to, the sawtooth wave 51 is used directly to modulate the output of a high frequency oscillator forming part of source 48. With the frequency of this oscillator being many times (possibly 100 times or more) the repetition frequency of sawtooth generator 24, the desired indication is produced. It will be understood that the oscillator and modulator thus forming circuit 48 may be of any conventional form known in the art.

The modulation of the output of source 48 to conform accurately with the shape of lobe 13 may be accomplished by deriving a suitably shaped modulating signal 53 from sweep generator 24. For this purpose, the wave form 51 of the output of sweep circuit 24 is modified in source 48 by suitable "rounding-off" circuits to provide the wave form 53 of Figure 5. Such "rounding-off" circuits may be simple high frequency by-pass or integrating circuits, such as resistor-condenser combinations shunted across the input of source 48. A particularly simple one is merely a condenser and resistor in series, with output taken from across the condenser or across the combination. Then these oscillations produced in source 48 are modulated by the wave form 53 to produce the desired output having the wave form 52 of Figure 5. Figure 4 shows the image on tube 23 thus produced, with the lobe-simulating indications 146. The corresponding indication on tube 38 is shown at 114b, 115b and 116b of Figure 4A, which correctly and properly simulate the desired indications shown in Figure 2.

Alternatively, wave form 52 may be impressed on a deflector for the beam of tube 38 instead of tube 23, mounted similarly to coil 47.

As a further alternative, a mask 54, shown in Figure 6, may be inserted in front of screen 32 and rotated by motor 29 (Fig. 3) in synchronism with the rotation of coils 28 and 47. A properly shaped opening 56 corresponding to lobe 13 would then take the place of wave 53 in modulating signal 52, and the signal 52 applied to coil 47 could then be of any amplitude high enough for line 146 to fill completely the area behind opening 56.

It will be obvious to those skilled in the art that still further modifications may be made without departing from the scope of the invention as determined by the following claim.

What is claimed is:

A radar simulator circuit comprising a flying spot scanning cathode ray tube having a neck in which an electron beam producing gun is located; a main deflection coil rotatably positioned on said neck to deflect the electron beam radially outward from its normal position; a second deflection coil rotatably mounted on said neck and oriented to deflect said beam perpendicular to the direction of deflection produced by said first coil, said coils rotating as a unit; a source of sawtooth-shaped sweep current connected to said first coil; a source of signal voltage having a repetition rate which is high in comparison to the repetition rate of said sweep current; a smoothing filter connected to said source of sweep current to be energized thereby; a connection between the output of said filter and an input circuit of said source of signal voltage to allow the output signal of said filter to modulate the amplitude of the signal voltage in said signal voltage source; a connection between output terminals of said source of signal voltage and said second deflection coil to apply the modulated signal voltage to said second deflection coil.

References Cited in the file of this patent

UNITED STATES PATENTS

| | | |
|---|---|---|
| 2,093,157 | Nakashima | Sept. 14, 1937 |
| 2,520,595 | Fernsler | Aug. 29, 1950 |
| 2,624,043 | Gerwin | Dec. 30, 1952 |
| 2,652,636 | Garman et al. | Sept. 22, 1953 |
| 2,674,812 | Hales | Apr. 13, 1954 |
| 2,677,199 | Droz | May 4, 1954 |

FOREIGN PATENTS

| | | |
|---|---|---|
| 643,521 | Great Britain | Sept. 20, 1950 |